Jan. 9, 1968 W. H. ACKER 3,362,138
GAS FILTER
Filed June 9, 1966
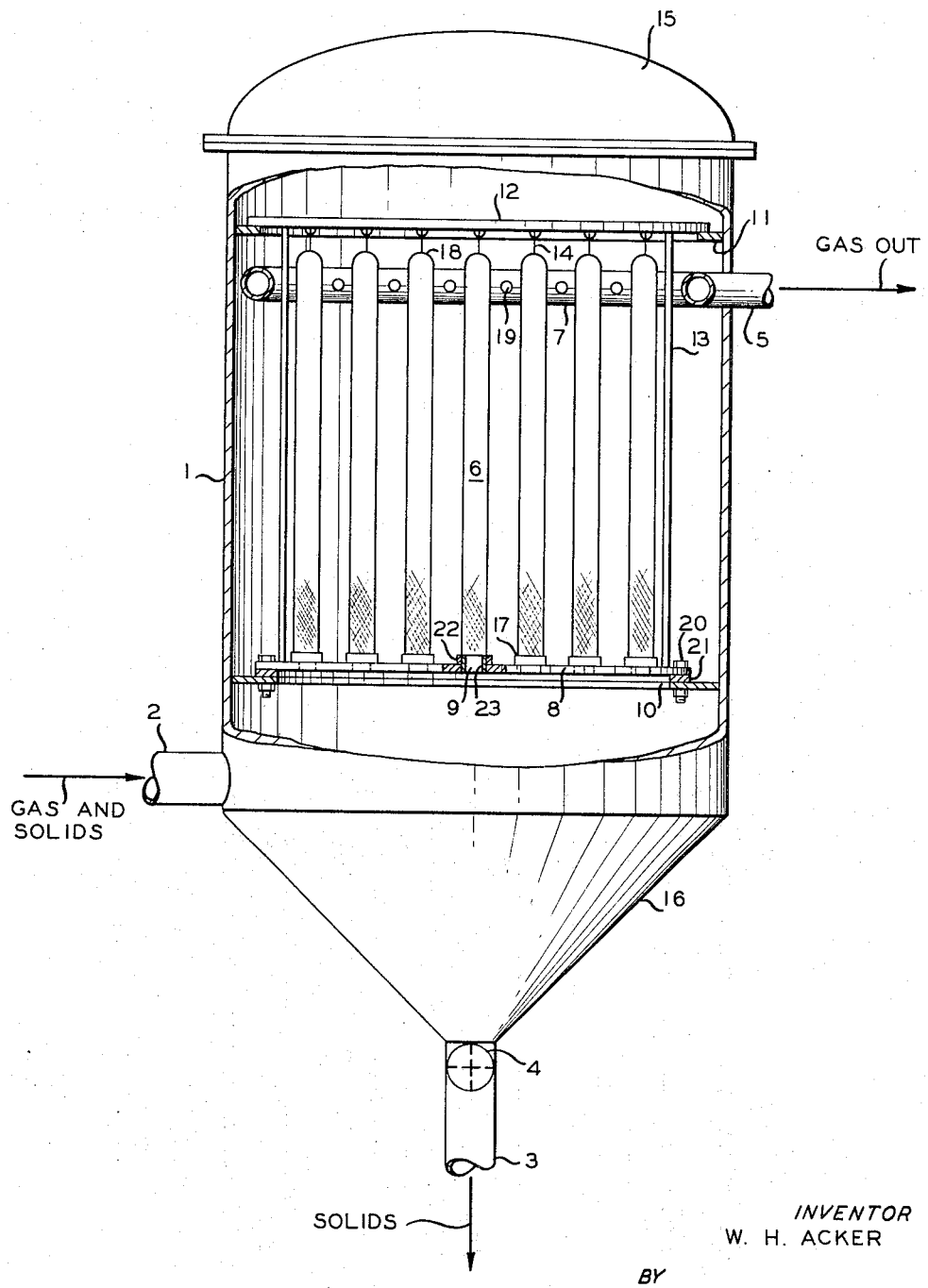
INVENTOR
W. H. ACKER
BY
ATTORNEYS United States Patent Office 3,362,138
Patented Jan. 9, 1968

3,362,138
GAS FILTER
Warren H. Acker, Borger, Tex., assignor to Phillips
Petroleum Company, a corporation of Delaware
Filed June 9, 1966, Ser. No. 556,334
3 Claims. (Cl. 55—341)

ABSTRACT OF THE DISCLOSURE

A gas-solids filter comprises an enclosed housing having suspended therein an upper imperforate support sheet from which are suspended a plurality of tubular filter elements having one open end in communication with perforations through a lower-spaced cell plate and further being in communication with gas solids inlet means and solids exit means in the lower portion of the filter housing below the cell plate, gas exit means above the cell plate, the support sheet and cell plate forming a unitary structure by means of rigid support members between the two.

---

This invention relates to an apparatus for separating solids from gases. In one aspect, this invention provides an apparatus comprising several tubular filter elements, each of said elements being fixedly attached at its closed end to a rigid support sheet and at its lower end to a cell plate having openings therethrough in direct communication with the open ends of said filter elements, the cell plate and support sheet being fixedly attached to and spaced from each other so as to form a unitary structure. In another aspect, the invention provides for a unitary gas filter cartridge for supporting flexible tubular filter elements being supported at their closed end by a support sheet and being in direct communication at their open end with passages through a cell plate to which they are fixedly attached at their open ends with the cell plate and support sheet further being fixedly attached to and spaced from each other in combination with a tubular vessel having a lower continuous internal flange for supporting the cell plate and an upper internal flange for supporting said support sheet with gas inlet means and solids exit means below said cell plate and with gas exit means above said cell plate.

In the separation of solids from gases at relatively high flow rates, it is generally necessary to employ a filter medium and structure having sufficiently high surface area to avoid excessive pressure drop through the filters. Numerous types of filter media have found application in such service although fabric or bag-type filters are generally employed in the majority of these operations. In order to provide a sufficiently high surface area to avoid undue pressure drop in such filters, it is generally found desirable to combine a number of tubular filter elements in one unit. When the gas flow rates to be accommodated are relatively high, as in the case where such filter elements are designed to operate on commercial units, a relatively large number of such filter elements must be employed in each filter cell, and it is not unusual that three or four hundred such elements will be employed to provide the necessary surface area for filtering one gas stream. As the filter elements are subject to plugging and deterioration, it is necessary to replace individual elements at intervals; the frequency of such maintenance depending upon the severity of the application. However, it is generally recognized that it is extremely difficult to locate faulty elements within a filter containing many such elements, and it is even more difficult to remove damaged filters without impairing the operation and efficiency of the remaining elements in the filter. As such maintenance is not only difficult and time-consuming in itself, but also generally results in substantial down time in the operating of the unit, or necessitates the provision of several filter systems in parallel for each process stream, it would be of considerable advantage to eliminate the difficulty in such maintenance with a consequent reduction in unit down time and/or filtering apparatus required.

I have found that these difficulties can be substantially minimized by providing a unitary filter cartridge which in itself contains the several filter elements required, and which can be rapidly replaced with a similar cartridge and repaired by ready access outside of the filter, and without the necessity of redirecting the process stream.

It is, therefore, an object of this invention to provide a unitary cellular filter cartridge for filtering gas streams.

It is another object of this invention to provide a unitary filter apparatus comprising several elements which can be readily removed from a process filter and repaired externally thereof, thereby minimizing maintenance difficulties, unit down time and filter apparatus requirements.

In accordance with one embodiment of this invention, a unitary cellular filter cartridge is provided for retaining several gas-permeable filter elements in fixed relation to the unitary structure and to each other. The unitary structure, or filter cartridge, preferably comprises two spaced supporting means fixedly attached to each other and between which the filter elements are suspended wherein one of the supports, referred to as a cell plate herein, is provided with openings therethrough to which the open ends of the filter elements are fixedly attached in direct communication so that gas and solids suspended therein passing through the openings in the cell plate also pass into the interior of the tubular filter elements with the result that the solids are separated from the gas, the gas permeates the walls of the filter element. In the presently preferred embodiment of the invention, the tubular filter elements are preferably oriented so that their major axis is substantially vertical with the open end downward. As a result, the solids removed from the gaseous suspension thereof as described is either collected on the inside wall of the filter element or, more preferably, is allowed to accumulate within the filter element and then fall back through the opening in the cell plate to either be collected in the filter vessel or removed therefrom by suitable means.

As shown in the drawing, in the presently preferred embodiment of this invention, a filter vessel 1 is provided having a removable top cover 15, gas inlet means 2 through which the suspension of solids and gas emitted to the filtering vessel, gas exit means 5 from which substantially solids-free gas is removed from the filtering vessel, and solids exit means 3 through which separated solid material is removed. The lower outer walls of the vessel 16 can also be cambered to provide for direction of separated solids to the exit. Since, in most applications, the vessel will be designed to operate under a pressure substantially different from atmospheric pressure or in any event different from the pressure at which the separated solids are to be accumulated after their exit from the filtering vessel, the rate of solids removal is preferably controlled by a suitable valve means 4, such as a star valve. The vessel is provided with a continuous internal flange 10 situated above the gas inlet means 2 to which the lower cell plate 8 of the unitary filter cartridge is fixedly attached by any suitable means such as bolts or wedge clamps 20. It is also generally desirable to provide continuous gasket means 21 between the lower support flange and the cell plate in that during the operation of the filter there will necessarily be a pressure drop across the cell plate. It is also presently preferred to provide an upper internally extending flange 11 for the purpose of supporting the upper support sheet 12 of the unitary filter cartridge. However, this additional support is not absolutely necessary due to the unitary structure of the cartridge.

The upper support sheet 12 and the lower cell plate 8 are fixedly attached and spaced from one another by support members 13 which can either be bolted or welded to the respective plates or fastened thereto by any other suitable means. Several gas-permeable filter cartridges 6 are suspended by suitable means 14 at their closed end 18 from the upper support sheet 12 and are further fixedly attached to the lower cell plate 8 by suitable sealing means at their open ends 17. The point of attachment of the filter elements to the lower cell plate necessarily corresponds to suitable openings 9 in the cell plate for the purpose of allowing the passage of gas and solids upwardly through the openings into the interior of the filter elements. The open ends of the filter elements can be fastened to the lower cell plate in communication with the openings therethrough by any suitable means sufficient to prevent the escape of unfiltered gas from the filter elements. For example, the openings in the cell plate can be provided with a collar 23 designed so as to extend beyond the upper surface of the cell plate a distance sufficient to allow the open end of the filter elements to be fitted over the collar extension with the further provision that suitable clamping means 22 can be provided to form a gas tight seal between the filter element and the collar extension.

Gas exit means 5 is desirably in communication with suitable gas collecting means 7 provided with suitable apertures 19 for removing filtered gas from the interior of the vessel.

In the operation of the vessel, gas containing solids suspended therein is passed into the filter by way of inlet 2 and is conducted upwardly through openings 9 in cell plate 8 into the interior of filter elements 6 from which the gas permeates the walls and passes out of the filter by way of exit 5. Solids accumulated in the interior of the filter elements are allowed to fall back through the openings in the cell plate into the lower part of the filter vessel and is removed by way of solids exit 3. When it becomes necessary to remove the filter cartridge for inspection due to deterioration of the filter elements, the gas flow to the filter through inlet 2 can be cut out and the top of the filter vessel 15 removed to permit access to and removal of the unitary filter cartridge comprising the upper support sheet, the lower cell plate and suspended filter elements. A similar filter cartridge is then inserted into the filter assembly and the top is replaced, after which flow can be cut back to the filter.

The apparatus of this invention is, of course, suitable for application in numerous varieties of service requiring separation of solids from fluids as desired, provided that the strength, temperature stability and specific permeability of the fabric are sufficient for the demands of the particular operation. Due to its design, however, the filter cartridge is particularly useful in relatively severe recovery operations such as, for example, the recovery of carbon black from process effluents or the separation and recovery of carbon black product from the effluent of carbon black furnaces.

Reasonable modification and variation of this invention will be apparent to one skilled in the art in view of the foregoing disclosure and the appended claims to this invention, the essence of which is that there is provided an apparatus for effecting the separation of solids from gases comprising a unitary filter cartridge having an upper support sheet fixedly attached to and spaced from a lower cell plate having suitable openings therein in direct communication and in sealed relationship with the open ends of several filter elements suspended between the support sheet and the cell plate and attached to the support sheet at their closed ends.

I claim:

1. Means for separating particulate solids from gaseous suspensions thereof comprising several tubular elements being permeable to said gas and impermeable to said solids, said elements being closed at one end and open at the other end, said closed end being attached to a rigid support sheet, and suspended therefrom, said open end being fixedly attached to a rigid cell plate in direct communication with corresponding openings through said cell plate, said support sheet being fixedly attached to said cell plate by rigid support members to form a unitary structure therebetween, said unitary structure being fixedly supported within a substantially pressure tight tubular vessel having a lower internal sealing flange for supporting said cell plate, said cell plate being fixedly attached to said sealing flange so as to allow passage of gas upward through said tubular vessel only through said openings in said cell plate, an upper internal support flange spaced from said lower flange so as to support said support sheet when said cell plate is fixedly attached to said lower flange, gas inlet means below said cell plate, solids exit means below said gas inlet means, and gas outlet means above said cell plate.

2. The apparatus of claim 1 wherein said gas exit means is positioned between said support sheet and said cell plate, and wherein said tubular filter elements are substantially vertically aligned whereby solids removed from said gas and accumulated in said filter elements is allowed to fall under the influence of gravity through said open end of said elements and said cell plate to said exit means.

3. The apparatus of claim 1 wherein said tubular filter elements are bag filters.

References Cited

UNITED STATES PATENTS

| 1,454,492 | 5/1923 | Stroud | 55—341 |
| 2,167,236 | 7/1939 | Gieslerr | 55—341 |
| 2,215,282 | 9/1940 | Williams | 55—341 |
| 2,805,731 | 9/1957 | Kron | 55—341 |
| 3,143,499 | 8/1964 | Miller | 210—308 |
| 3,170,873 | 2/1965 | May | 210—323 |

FOREIGN PATENTS

| 982,212 | 2/1965 | Great Britain. |

HARRY B. THORNTON, *Primary Examiner.*

B. NOZICK, *Assistant Examiner.*